Feb. 10, 1970 D. A. BROOKS 3,495,217

DIGITAL DATA TRANSMISSION APPARATUS

Filed Dec. 19, 1966

INVENTOR.
DAVID A. BROOKS

BY Bruce C. Lutz

ATTORNEY

United States Patent Office
3,495,217
Patented Feb. 10, 1970

3,495,217
DIGITAL DATA TRANSMISSION APPARATUS
David A. Brooks, Clearwater, Fla., assignor to Honeywell Inc., Minneapolis, Minn., a corporation of Delaware
Filed Dec. 19, 1966, Ser. No. 602,934
Int. Cl. H04q *5/14;* H04l *5/16;* H03k *17/00*
U.S. Cl. 340—147 5 Claims

ABSTRACT OF THE DISCLOSURE

This disclosure shows an integrated semiconductor driver-receiver circuit for transmitting and receiving digital information on a single line.

Background of the invention

This invention pertains to digital apparatus and more specifically to digital data transmission or handling apparatus.

In the past it has often been necessary to provide a computer with input and output circuitry for communicating with external or peripheral devices, with data collection and utilization devices or with another computer. If the communication link was a two-way link, it was necessary to provide a first line for sending digital information and a second line for receiving information. However, if there was a large number of devices with which it was desired to communicate the amount of circuitry and the number of interconnecting lines tended to become unreasonably large. Furthermore, when a computer was used in an airborne or spaceborne system, size and weight become relevant considerations.

Summary of the invention

This invention overcomes some of the disadvantages of the prior art by providing driver and receiver circuitry in one compact unit which is capable of both transmitting and receiving pulse information on the same transmission line. Thus, only one communication link is required between the computer and each external device. Of course, it may be necessary for the computer to also have the capability of transmitting interrupt or enable signals to the external device so that data is transmitted only when both the computer and the external device are available for transmitting and receiving. Furthermore, this invention provides circuitry in which the driver and receiver may be integrated thereby greatly decreasing the size of the input and output circuitry. This advantage is especially important where a large number of input and output channels are required.

In accordance with this invention there is provided a driver connected to a transmission line. The driver is made up of transistors which switch in response to input pulses to drive output pulses down the transmission line. There is also provided a semiconductor or transistor receiver which switches in response to pulses which are received on the transmission line. Another feature of this invention is a transistor switching circuit which tends to speed up charging of the equivalent capacitance of the transmission line. The switching transistor is triggered to connect the transmission line to a positive power supply for a predetermined time so that a low impedance charging path is provided.

Accordingly, it is an object of this invention to provide digital input-output circuitry for use in transmitting pulse information on a transmission line and for receiving pulse information on the same transmission line.

It is another object of this invention to provide a digital input-output driver-receiver circuit which can be integrated to decrease size and weight.

It is a further object of this invention to provide an input-output driver-receiver circuit with the capability of being able to rapidly charge the equivalent capacitance of a transmission line so that the trailing edge of pulses transmitted on the transmission line are sharper.

Figure 1:
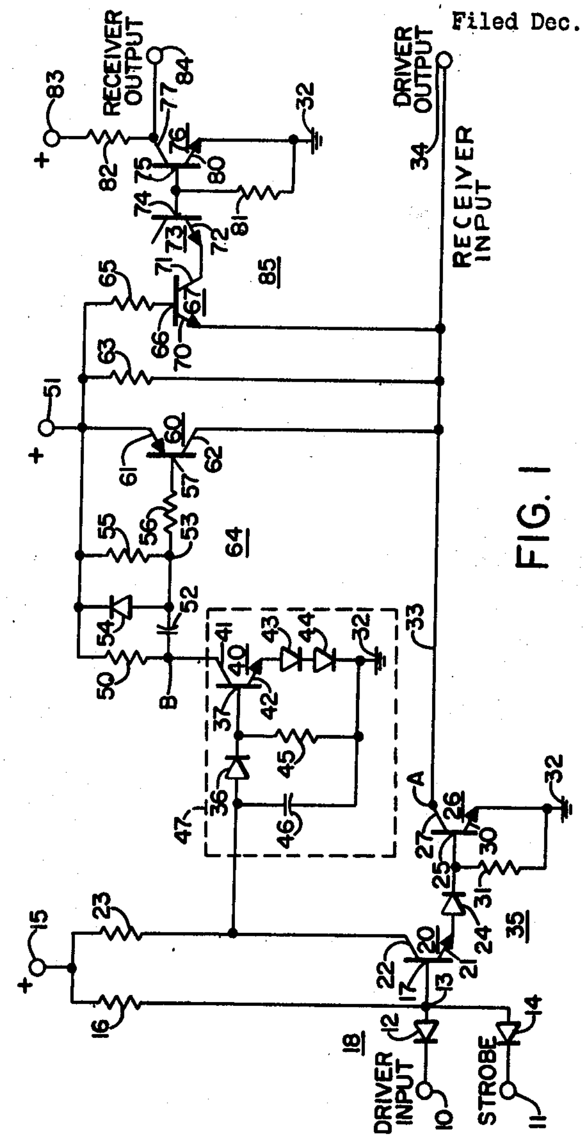
FIGURE 1 is a circuit schematic of the preferred embodiment of this invention.

These and other objects and advantages of this invention will become evident to those skilled in the art upon a reading of this specification and the appended claims in conjunction with the drawing, of which:

Structure of FIGURE 1

Referring now to FIGURE 1, there is shown an input means or terminal 10 labeled DRIVER INPUT and an input means or terminal 11 labeled STROBE. Terminal 10 is connected to a cathode of a diode or unidirectional conducting means 12. The anode of diode 12 is connected to a junction point 13. Terminal 11 is connected to the cathode of a diode or unidirectional conducting means 14 which has its anode also connected to junction point 13. Junction point 13 is connected to a positive source of energization potential 15 by means of a resistor 16. Diodes 12 and 14 together with resistor 16 comprise an AND or coincident gate 18.

Junction point 13 is further connected to an input means, control means, or base means 17 of an NPN transistor means 20. Transistor 20 further has a first output means or emitter means 21 and a second output means or collector means 22. Collector 22 is connected by means of a resistor 23 to positive source 15. Emitter 21 is connected to the anode of a diode 24 which has its cathode connected to an input means, control means, or base means 25 of an NPN transistor means 26. Transistor 26 further has an output means or collector means 27 and a common means or emitter means 30. Base 25 is further connected by means of a resistor 31 to a common conductor 32 which is illustrated by a ground symbol. Emitter 30 is directly connected to common conductor 32. Collector 27 is connected by means of a conductor, lead, or connection 33 to a terminal 34. Terminal 34 is both the driver output terminal or means and receiver input terminal or means. Transistors 20 and 26 together with their associated circuitry comprise a first transistor means or driver means 35.

Collector 22 of transistor 20 is further connected to anode of a diode 36 the cathode of which is connected to an input means, control means, or base means 37 of an NPN transistor means 40. Transistor 40 further has an output means or collector means 41 and a common means or emitter means 42. Emitter 42 is connected by means of a series connection of a diode 43 and a diode 44 to common conductor 32. Base 37 is connected by means of a resistor 45 to common conductor 32 and the anode of diode 36 is connected by means of a capacitance means or capacitor 46 to common conductor 32. Diode 36, transistor 40, diode 43, diode 44, resistor 45, and capacitor 46 are enclosed in dotted lines 47 to indicate the portion of FIGURE 1 which is replaced by the alternate embodiment shown in FIGURE 3.

Collector 41 of transistor 40 is connected by means of a resistor 50 to a positive power, potential, or current supplying means or source 51. Collector 41 is further connected by means of a capacitance means or capacitor 52 to a junction point 53. Junction point 53 is connected to positive source 51 by means of a parallel connection of a diode 54 and a resistor 55. Diode 54 has its easy direction of current flow from junction point 53 to source 51.

Capacitor 52 together with diode 54 and resistor 55 comprises a delay means. Junction point 53 is further connected by means of a resistor 56 to an input means, control means, or base means 57 of a PNP transistor means 60. Transistor means 60 further has a first output means or emitter means 61 and a second output means or collector means 62. Emitter 61 is connected to positive source 51 and collector 62 is connected to output line 33. Output line 33 is further connected by means of a resistor 63 to positive source 51. Transistors 40 and 60, together with their associated circuitry, comprise a transistor means 64 which is adapted to connect output line 33 to positive source 51 for a predetermined time after the trailing edge of an input pulse.

Positive source 51 is further connected by means of a resistor 65 to an input means or base means 66 of an NPN transistor means 67. Transistor 67 further has a second input means or emitter means 70 and an output means or collector means 71. Emitter 70 is connected to output line 33. Collector 71 is connected to an input means or emitter means 72 of an NPN transistor means 73. Transistor 73 further has an output means or base means 74 which is connected to an input means, control means, or base means 75 of an NPN transistor means 76. Transistor means 76 further has an output means or collector means 77 and a common means or emitter means 80. Emitter 80 is directly connected to common conductor 32 and base 75 is connected by means of a resistor 81 to common conductor 32. Collector 77 is connected by means of a resistor 82 to a positive potential supplying means or source 83 and is further connected to an output terminal or means 84 labeled RECEIVER OUTPUT. Transistors 67, 73, and 76 and their associated circuitry comprise a transistor means or receiver means 85.

Operation of FIGURE 1

To understand the operation of the circuit illustrated in FIGURE 1, first assume that no input signals are applied at any of the input terminals. When there are no input signals present at terminals 10 and 11, both of those terminals are approximately at ground potential, or they may be negative. When terminals 10 and 11 are at ground or negative, the base 17 of transistor 20 will be at approximately the same potential so that transistor 20 will be in a nonconducting or OFF condition or state. As transistor 20 is nonconducting its emitter 21 will be at approximately the potential of the common conductor 32. Hence, base 25 of transistor 26 will be at approximately the same potential as emitter 30 so that transistor 26 will also be in a nonconducting or OFF condition or state. Assuming that terminals 10 and 11 are at approximately ground potential, there will be current flowing from source 15 through resistor 16 and diodes 12 and 14 to terminals 10 and 11. There will be a small voltage drop across diodes 12 and 14 so that base 17 of transistor 20 will be slightly positive. Diode 24 is inserted between emitter 21 of transistor 20 and base 25 of transistor 26 to provide a compensated voltage differential to slightly raise the potential of emitter 21. When transistor 26 is nonconducting, output line 33 will be at a high potential due to the fact that it is coupled to positive supply 51 through resistor 63.

When transistor 20 is nonconducting, collector 22 will be at approximately the potential of positive source 15. Hence current will flow from positive source 15 through resistor 23 and capacitor 46 to common conductor 32 thereby charging capacitor 46. Current will also flow through diode 36 to base 37 of transistor 40 thereby switching transistor 40 to a conducting or ON condition or state. When transistor 40 is conducting, collector 41 will be slightly positive but substantially less positive than the potential of positive source 51. Current will flow from positive source 51 through resistor 55, capacitor 52, transistor 40, diode 43, and diode 44 to common conductor 32 thereby charging capacitor 52. When capacitor 52 is charged, terminal 53 will be at approximately the same potential as positive source 51 so that base 57 of transistor 60 will also be at approximately the same potential as that of source 51. Accordingly, transistor 60 will be in a nonconducting or OFF condition or state.

Current will also flow from positive source 51 through resistor 65 to base 66 of transistor 67. When output line 33 is positive or at a high potential, emitter 70 of transistor 67 will also be positive so that the base current in transistor 67 will be shunted out of collector 71. Those skilled in the art will realize that transistor 67 is being operated in an inverted configuration. The current in collector 71 will flow to emitter 72 of transistor 73. As transistor 73 is an NPN transistor, current flow into its emitter will tend to back-bias the transistor. However, with the collector of transistor 73 disconnected, transistor 73 will act like a Zener diode because when emitter 72 becomes sufficiently positive, the emitter base junction of transistor 73 will break down to conduct in the back direction. It should be noted that the breakdown characteristics of a transistor used in the manner in which transistor 73 is used probably will be better than the characteristics of a Zener diode in that breakdown knee is sharper and there is less junction capacitance. Transistor 73 is used for noise rejection and for this purpose it is satisfactory and may be considerably cheaper and easier to integrate into an integrated circuit than a Zener diode. When the emitter-base junction of transistor 73 breaks down, current will flow from base 74 of transistor 73 to base 75 of transistor 76 thereby causing transistor 76 to switch to a conducting or ON condition or state. When transistor 76 is conducting, collector 77 will be at approximately the potential of common conductor 32 so that the potential of output terminal 84 will be low.

It will now be assumed that a positive pulse is applied at driver input terminal 10. The positive pulse will raise the potential of terminal 10, however, the potential of junction point 13 and hence base 17 of transistor 20 will remain low due to the fact that terminal 11 remains at a low potential. Accordingly, transistor 20 will remain OFF. Next, it will be assumed that in addition to a positive pulse applied at terminal 10 a positive voltage is also applied at terminal 11. Now the potential of junction point 13 and base 17 of transistor 20 will be made positive so that transistor 20 will be switched to a conducting or ON condition or state. Current will then flow from positive source 15 through resistor 23, transistor 20 and diode 24 to base 25 of transistor 26. This current flow will switch transistor 26 to a conducting or ON condition or state. When transistor 26 is conducting, collector 27 and hence output line 33 will be at approximately the same potential as common conductor 32. Thus, it is seen that in response to a positive pulse at terminal 10 a negative going pulse is applied to line 33 and hence output terminal 34.

When the input pulse is removed from input terminal 10, input terminal 10 will be returned to approximately ground potential or a low potential so that transistor 20 will be switched OFF. When transistor 20 is switched OFF, the base current supplied to transistor 26 will be removed so that transistor 26 wil tend to switch OFF also. However, assuming that output terminal 34 is connected to a transmission line or similar transmission medium, it will take a considerable time for output line 33 to rise to a positive potential due to the fact that the transmission line will have an equivalent capacitance. This equivalent capacitance will be charged by current flow from positive source 51 through resistor 63 to output terminal 34. Switching circuit 64 aids in charging this equivalent capacitance by switching transistor 60 to a conducting state when transistor 20 begins to switch OFF.

When transistor 20 switches ON, collector 22 will drop in potential thereby discharging capacitor 46, reverse biasing diode 36, and removing the base current from base 37 of transistor 40. Transistor 40 will then switch to a non-conducting or OFF condition or state therby raising the potential of collector 41. When the potential of collector 41 rises, capacitor 52 will transmit a positive pulse to the base 57 of transistor 60 to hold transistor 60 in a nonconducting or OFF condition or state. Capacitor 52 will then discharge through diode 54 and resistor 50 until both sides of the capacitor are approximately the same potential. When transistor 20 begins to switch OFF, collector 22 will rise in potential thereby switching transistor 40 ON. When transistor 40 becomes conductive, the potential of collector 41 will drop. When the potential of collector 41 drops, current will be drawn from base 57 of transistor 60 through resistor 56 and capacitor 52 to collector 41. This current flow will switch transistor 60 to a conducting or ON condition or state thereby connecting positive source 51 to output line 33. Current will then flow from source 51 through transistor 60 to output terminal 34 to charge the equivalent capacitance of the transmission line connected to terminal 34. Capacitor 52 will again charge due to current flow from source 51 through resistor 55 and transistor 40 thereby providing a time delay for holding transistor 60 ON. When capacitor 52 charges sufficiently, transistor 60 will return to a nonconducting condition or state. The time required for capacitor 52 to charge is predetermined by the size of capacitor 52 and the size of resistor 55.

The operation of receiver 85 will now be explained. Assume that the potential of terminal 34 is plus or high. Then the base current in transistor 67 will be shunted through transistor 73 of transistor 76 to hold transistor 76 ON so that receiver output terminal 84 is at a low potential as was explained hereinbefore. When a pulse is received at terminal 34, line 33 drops to a low potential. When line 33 is at a low potential, the base current in transistor 67 is shunted out of emitter 70 so that the emitter base junction of transistor 73 no longer conducts current. Thus, transistor 76 will switch to a nonconducting or OFF condition or state because the base current to base 75 is removed. When transistor 76 becomes nonconductive the potential of conductor 77 rises thereby raising the potential of output terminal 84 to indicate the presence of a pulse at terminal 34. When the pulse at terminal 34 ends, transistor 76 will be switched ON again.

Figure 2:
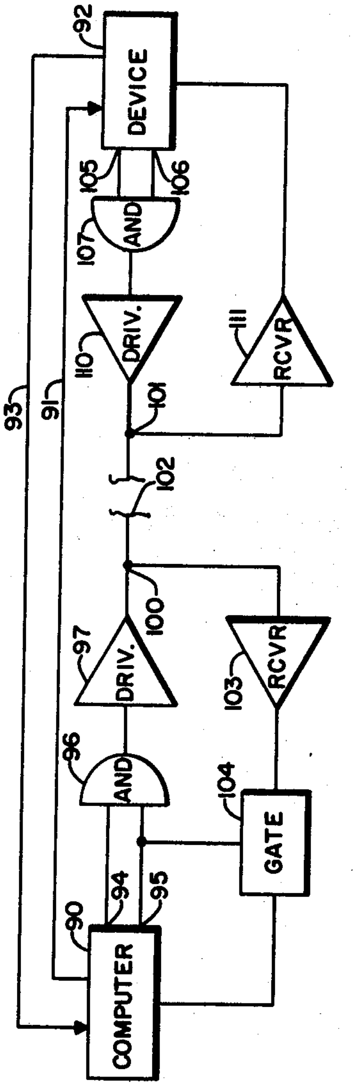
FIGURE 2 is a block diagram illustrating the use of this invention in a system.

Structure of FIGURE 2

Referring now to FIGURE 2, the use of the circuitry of FIGURE 1 in a data transmission system will be described. In FIGURE 2 there is shown a computer or similar data generating device or data receiving device 90. Computer 90 is coupled by a first connection 91 to a block 92 labeled DEVICE which may be a second computer or a peripheral device or another device adapted to receive and/or transmit digital data. A second connection 93 linking computer 90 and device 92 is also shown. Computer 90 has first and second outputs 94 and 95 which are connected to first and second inputs of a coincidence or AND gate 96. Gate 96 has an output connected to an input of a driver circuit 97 which further has an output connected to a junction point 100. Junction point 100 is connected to a junction point 101 by means of a transmission medium, transmission means, transmission line, or similar connection illustrated schematically by a broken line 102. Junction point 100 is connected to an input of a receiver 103 which has an output connected to a gate 104. Gate 104 has a second input which is connected to output 95 of computer 90. Gate 104 has an output which is connected to an input of computer 90. Device 92 has first and second outputs 105 and 106 which are connected to first and second inputs of a gate 107 similar to gate 96. Gate 107 has an output connected to an input of a driver circuit 110 similar to driver circuit 97. An output of driver circuit 110 is connected to junction point 101. Junction point 101 is further connected to an input of a receiver circuit 111 which is similar to receiver circuit 103. Receiver circuit 111 has an output which is connected to an input of device 92.

Operation of FIGURE 2

The structure of FIGURE 2 relates to the structure of FIGURE 1 in the following manner. Gates 96 and 107 correspond to gate 18 of FIGURE 1. Drivers 97 and 110 correspond to driver 35 of FIGURE 1 and include chopper 64. Receivers 103 and 111 correspond to receiver 85 of FIGURE 1. Terminals 100 and 101 correspond to terminal 34 of FIGURE 1. Terminals 94 and 105 correspond to terminal 10 and terminals 95 and 106 correspond to terminal 11. Computer 90, device 92, and gate 104 are not shown in FIGURE 1. It should be noted that computer 90 may be connected to several devices for communicating therebetween. As it may or may not be possible to simultaneously communicate between more than one device, an interrupt system may be necessary. For example, computer 90 may not be able to receive information from device 92 except at certain times. An interrupt or enable signal will be transmitted by computer 90 over line 91 to device 92 to signal device 92 that computer 90 is now ready to receive information. Similarly, device 92 may not be able to receive information at all times so that it also will transmit an interrupt signal over line 93 when it is ready to receive data. It will be assumed that device 92 is ready to transmit data. One or both of lines 91 and 93 may or may not be necessary depending upon the specific application where the invention is used.

When computer 90 is ready to receive data from device 92, an interrupt signal is transmitted to device 92 over line 91. The interrupt signal causes device 92 to apply a strobe signal at output terminal 106 which enables AND gate 107. The data signal which is a series of "1" and "0" signals is applied at output terminal 105. These signals cause driver 110 to transmit pulses down transmission line 102 to receiver 103. Receiver 103 receives the pulses and transmits them through gate 104 to computer 90.

The operation of FIGURE 2 is similar when it is desired to transmit data from computer 90 to device 92. Note that in FIGURE 1 when transistor 26 is switched to a conducting state, receiver 85 will also be triggered to provide an output pulse at output terminal 84. In some cases it may be undesirable to have the receiver providing output pulses when the driver on the same end is transmitting. This problem can be overcome by providing a gate similar to gate 104 between the receiver 103 and computer 90. When driver 97 is transmitting pulses, a strobe signal may be applied to an input of gate 104 to inhibit gate 104 so that pulses cannot be transmitted through it. When the computer 90 completes its transmission, the strobe signal at terminal 95 is removed and gate 104 is enabled so that if device 92 transmits pulses, receiver 103 will transmit output pulses through gate 104.

Assume that computer 90 and device 92 intercommunicate by means of binary data. This would mean that computer 90 would transmit binary words to device 92 or vice versa. In the arrangement shown in FIGURE 2 only one channel for transmitting data is provided so that the binary words would have to be transmitted serially, that is, bit-by-bit. In some cases serial transmission may be too slow. In such cases a set of transmission links may be provided with one driver-receiver circuit and one transmission line for each bit. This method of transmission is called parallel transmission. It is evident that that amount of circuitry is considerably increased, however, the speed of operation is correspondingly increased.

Figure 3:
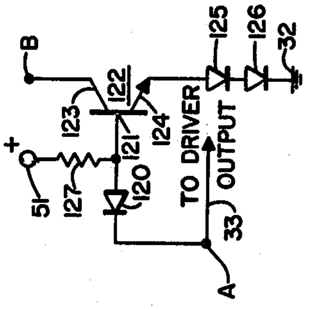
FIGURE 3 is a circuit schematic of an alternate embodiment of a portion of FIGURE 1.

Structure of FIGURE 3

In FIGURE 3 there is shown an alternative embodiment of FIGURE 1. In FIGURE 1 there is shown a junction A between collector 27 and transistor 26 and output line 33. The same junction is shown together with a portion of line 33 in FIGURE 3. Junction A is connected to the cathode of a diode 120, the anode of which is connected to an input means, control means, or base means 121 of an NPN transistor means 122. Transistor 122 further has an output means or collector means 123 and a common means or emitter means 124. Emitter 124 is connected to common conductor 32 by means of a serial connection of diodes 125 and 126. Diodes 125 and 126 are connected so that the easy direction of current flow is from emitter 124 to common conductor 32. Collector 123 is connected to a terminal labeled B and base 121 is connected to positive source 51 by means of a resistor 127. Positive source 51 of FIGURE 3 is the same as positive source 51 of FIGURE 1. The circuit of FIGURE 3 replaces the circuit enclosed within the block labeled 47 of FIGURE 1. Collector 123 of transistor 122 of FIGURE 3 is connected to capacitor 52 and resistor 50 in a manner similar to the connection of collector 41 of transistor 40. Note that in FIGURE 3 there is no connection between base 121 of transistor 122 and collector 22 of transistor 20. Instead, collector 27 of transistor 26 provides the triggering signals to transistor 122.

Operation of FIGURE 3

When the output line 33 is at a positive or high potential, diode 120 is back-biased. However, current flow from source 51 through resistor 127 to base 121 of of transistor 122 will hold transistor 122 in a conducting or ON condition or state. When transistor 26 is switched to a conducting state and the potential of output line 33 is lowered, base 121 of transistor 122 will be correspondingly lowered in potential to switch transistor 122 to a nonconducting state or OFF. Accordingly, it is seen that the major difference between the structure of FIGURE 3 and that of FIGURE 1 is that the chopper transistor means 64 is triggered from the output line 33 in FIGURE 3 instead of from collector 22 of transistor 20 as in FIGURE 1. The reason that the embodiment of FIGURE 1 is preferred is that where the transmission line is noisy the structure as shown in FIGURE 3 may be falsely triggered. Also, the structure of FIGURE 3 requires closer tolerances on the amplitude of pulses to prevent improper operation by false triggering.

I claim as my invention:

1. Digital data handling apparatus comprising, in combination:

data transmission means;

data input means for providing digital input signals;

first and second transistor means each having input and output means;

means connecting said input means of said first transistor means to said data input means whereby said digital input signals cause said first transistor means to switch from a first conducting condition to a second conducting condition, said first transistor means providing output pulses at said output means of said first transistor means indicative of said digital input signals;

means connecting said output means of said first transistor means to said data transmission means for transmitting said output pulses on said data transmission means;

means connecting said input means of said second transistor means to said data transmission means whereby pulses received on said data transmission means whereby pulses received on said data transmission means cause said second transistor means to switch from a first conducting condition to a second conducting condition, said second transistor means providing output signals at said output means of said second transistor means indicative of said pulses received on said data transmission means;

data output means connected to said output means of said second transistor means for receiving said output signals therefrom;

third transistor means having a control means and an output means and further having a delay means;

power supplying means connected to said third transistor means;

means connecting said control means to said output means of said first transistor means for switching said third transistor means to a second conducting condition and for activating said delay means when said first transistor means is switched to said first conducting condition from said second conducting condition, said delay means causing said third transistor means to return to a first conducting condition after a predetermined time; and means connecting said output means of said third transistor means to said data transmission means, said third transistor means operating to connect said power supplying means to said data transmission means when said third transistor means is in said first conducting condition.

2. Digital data handling apparatus as defined in claim 1 wherein said means connecting said input means of said first transistor means to said data input means includes coincident gating means and synchronizing means, said data input means being connected to a first input means of said coincident gating means, said synchronizing means being connected to a second input means of said coincident gating means, and said input means of said first transistor means being connected to an output means of said coincident gating means, whereby said digital input signals are transmitted through said coincident gating means only when signals from said synchronizing means are present at the second input means of said coincident gating means.

3. Digital data handling apparatus as defined in claim 1 wherein said first transistor means includes:

a first transistor having input means, first output means, and second output means and further having first and second conducting states, said input means of said first transistor comprising said input means of said first transistor means whereby said digital input signals cause said first transistor to switch from said first conducting state to said second conducting state;

a second transistor having input means and output means and further having first and second conducting states; and means connecting said first output means of said first transistor to said input means of said second transistor whereby said second transistor is switched from said first conducting state to said second conducting state when said first transistor is in said second conducting state, said output means of said second transistor being connected to said data transmission means and said second output means of said first transistor being connected to said control means of said third transistor means.

4. Digital data handling apparatus as defined in claim 3 wherein said second transistor means includes:

a third transistor having base means, input means, and output means;

means connecting said base means to said power supplying means, said input means of said third transistor comprising said input means of said second transistor means;

a fourth transistor having base means and output means and further having first and second conducting states; and means connecting said output means of said third transistor to said base means of said fourth transistor, said output means of said fourth transistor comprising said output means of said second transistor means, whereby said third transistor supplies a signal to said base means of said fourth transistor to hold said fourth transistor in said second conducting state when no pulses are present on said data transmission means and to switch said fourth transistor to said first conducting state when pulses are present on said data transmission means.

5. Digital data handling apparatus as defined in claim 4 wherein said third transistor means includes:

a fifth transistor having a control means comprising said control means of said third transistor means and output means, said fifth transistor further having first and second conducting states;

a sixth transistor having input means, first output means, and second output means, said first output means of said sixth transistor being connected to said power supplying means and said second output means of said sixth transistor being connected to said data transmission means; and means connecting said delay means between said output means of said fifth transistor and said input means of said sixth transistor, said delay means including capacitive means.

References Cited

UNITED STATES PATENTS

| | | | |
|---|---|---|---|
| 3,179,931 | 4/1965 | Middaugh | 340—152 XR |
| 3,213,424 | 10/1965 | Reuther et al. | 340—147 XR |
| 3,336,577 | 8/1967 | Frielinghauss | 340—163 |

DONALD J. YUSKO, Primary Examiner